(12) United States Patent
Bolin et al.

(10) Patent No.: US 10,191,463 B2
(45) Date of Patent: Jan. 29, 2019

(54) MACHINE SYSTEM AND ASSOCIATED METHOD FOR OPTICAL ENDPOINT CONTROL OPTIMIZATION

(71) Applicant: The Boeing Company, Chicago, IL (US)

(72) Inventors: Jared L. Bolin, Millstadt, IL (US); Philip L. Freeman, Summerville, SC (US); Samuel J. Easley, St. Peters, MO (US)

(73) Assignee: The Boeing Company, Chicago, IL (US)

(*) Notice: Subject to any disclaimer, the term of this patent is extended or adjusted under 35 U.S.C. 154(b) by 303 days.

(21) Appl. No.: 15/202,301

(22) Filed: Jul. 5, 2016

(65) Prior Publication Data

US 2018/0011462 A1    Jan. 11, 2018

(51) Int. Cl.
| | |
|---|---|
| *G05B 19/00* | (2006.01) |
| *G05B 19/042* | (2006.01) |
| *H02P 6/17* | (2016.01) |
| *G05B 15/02* | (2006.01) |
| *G05B 19/402* | (2006.01) |

(52) U.S. Cl.
CPC ......... *G05B 19/0428* (2013.01); *G05B 15/02* (2013.01); *G05B 19/402* (2013.01); *H02P 6/17* (2016.02); *G05B 2219/36415* (2013.01); *G05B 2219/37275* (2013.01)

(58) Field of Classification Search
CPC ................ G05B 19/0428; G05B 15/02; G05B 2219/37275; G05B 2219/36415; H02P 6/17
See application file for complete search history.

(56) References Cited

U.S. PATENT DOCUMENTS

| | | | | |
|---|---|---|---|---|
| 5,903,459 A | * | 5/1999 | Greenwood | ......... G05B 19/401 |
| | | | | 700/108 |
| 6,392,222 B1 | | 5/2002 | Greenwood | |
| 6,420,694 B1 | * | 7/2002 | Greenwood | ......... G01C 15/002 |
| | | | | 250/221 |

(Continued)

OTHER PUBLICATIONS

"Active Target: Motorized Laser Tracking Target", Automated Precision Inc., 2010, 4 pgs.

(Continued)

*Primary Examiner* — Christopher E. Everett
(74) *Attorney, Agent, or Firm* — Kwan & Olynick LLP

(57) ABSTRACT

Provided is a machine system having optical endpoint control and associated method for maintaining having is provided constant optical contact. Specifically, the machine system comprises a machine capable of movement in at least one direction. The machine is configured such that, during a calibration phase, a steerable retroreflective system is mounted upon the machine for movement therewith. A controller is configured to control the movement of the machine in at least one direction. The machine system may be configured to automatically adjust the feedrate of the machine, upon determining that a velocity required for the positioner to move the retroreflector to a desired position exceeds a certain segment feedrate threshold, such that an incident beam of light can maintain constant contact with the retroreflector throughout movement of the machine from the first position to the second position.

23 Claims, 10 Drawing Sheets

(56) References Cited

U.S. PATENT DOCUMENTS

| | | | |
|---|---|---|---|
| 7,050,883 B2* | 5/2006 | Cho | G05B 19/19 |
| | | | 700/188 |
| 8,803,055 B2 | 8/2014 | Lau et al. | |
| 2007/0046677 A1* | 3/2007 | Hong | G05B 19/41 |
| | | | 345/442 |
| 2008/0009964 A1* | 1/2008 | Bruemmer | G05D 1/0088 |
| | | | 700/245 |

OTHER PUBLICATIONS

"Feed Rate Optimization Program for Machining", Feed Rate Optimization of NC Programs with NPRO, Retrieved from the Internet: http://www.malinc.com/products/feedrateoptimization/, Accessed on Mar. 28, 2016, 2 pgs.

"VERICUT Module; OptiPath", Retrieved from the Internet: http://www.cgtech.com/products/aboutvericut/optipath/, Accessed on Mar. 28, 2016, 2 pgs.

* cited by examiner

MACHINE SYSTEM AND ASSOCIATED METHOD FOR OPTICAL ENDPOINT CONTROL OPTIMIZATION

BACKGROUND

Current machine tooling systems may use laser tracking systems in conjunction with retroreflectors to precisely determine the position of a moveable machine or component during fabrication or tooling processes, including calibration thereof. To avoid losing contact with the laser beam emitted by a laser tracking system during movement of the machine tool, improved retroreflectors and steerable retroreflective systems may be used to increase the angle of acceptance of the retroreflector so that the retroreflector remains in constant contact with the laser beam. However, a retroreflector may still lose contact with a laser beam in certain circumstances in which movement of a machine tool causes a steerable retroreflective system and/or laser tracking system to surpass the axis velocities of the respective systems. Existing solutions require a machine tool operator to manually observe the position and velocity of the retroreflector and use a feedrate override on the machine tool controller to avoid laser beam breaks, which creates error due to human-machine interaction, increases labor need, and prolongs machine tool measurement times. Thus, there is a need for an improved system and method for maintaining optical contact between a retroreflective system and the light source during fabrication or tooling processes.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are configured machine systems, and methods, for adjusting machine feedrates for optical endpoint control optimization. The described systems and methods may be implemented to maintain constant optical contact between a light source and a mounted steerable retroreflective system during fabrication or tooling processes, including calibration. In various embodiments, a machine system having optical endpoint control comprises a machine capable of movement in at least one direction. The machine may be configured such that, during a calibration phase, a steerable retroreflective system is mounted upon the machine for movement therewith. The steerable retroreflective system may comprise a retroreflector for reflecting at least some light incident thereupon and a positioner for moving said retroreflector. The positioner may include one or more of the following motors: an azimuth motor and an elevation motor. The rotational axis of the azimuth motor is perpendicular to the rotational axis of the elevation motor.

The machine system may further comprise a controller configured to control the movement of the machine in the at least one direction. The machine may comprise one or more rotatable joints. The machine system may be configured to determine the position of the retroreflector based on determining the position of one or more axes of the machine, where each axis corresponds to a rotatable joint of the machine.

The machine system may be configured to adjust the feedrate of the machine upon determining that the velocity required for the positioner to move the retroreflector to a desired position exceeds a certain segment feedrate threshold, such that an incident beam of light can maintain constant contact with the retroreflector throughout movement of the machine from the first position to the second position. In various embodiments, adjusting the feedrate of the machine includes limiting the feedrate of the machine for a segment ($F_{i,k}$) to a value determined by the equation:

$$F_{i,k} = \min\left(\frac{mag * velMax}{dC2}, \frac{mag * velMax}{dB2}, normFeed\right)$$

where mag is a distance traveled by the machine from a start-point to an end-point of the segment, where velMax is a maximum rotary velocity of the one or more motors of the positioner, where dC2 is a degree of rotation of the azimuth motor required to adjust the retroreflector for the segment, where dB2 is a degree of rotation of the elevation motor required to adjust the retroreflector for the segment, and where normFeed is the maximum feedrate of the machine. The machine system may be further configured to adjust the feedrate of the machine by predetermining the feedrate path of the machine before the calibration phase occurs. Alternatively, and/or additionally, the machine system may be further configured to automatically adjust the feedrate of the machine in real-time. In such embodiments, the machine system may further be configured to detect reflections of the beam of light from the retroreflector and determine the position of a portion of the machine based upon the reflected light.

Provided also is a method for adjusting machine feedrate. According to various embodiments, the method comprises determining a first position and a second position of a machine. The first position and the second position may define a movement of the machine in three-dimensional space. The machine may comprise one or more rotatable joints. The method further comprises segmenting the movement of the machine into one or more segments. Each segment defines an incremental movement of the machine between a start-point and an end-point in three-dimensional space.

The method further comprises determining the position of a retroreflector mounted on the machine at the start-point and the end-point of each segment based on the position of the machine. Determining the position of the retroreflector may include detecting the position of one or more axes of the machine, wherein each axis corresponds to a rotatable joint of the machine.

The method further comprises adjusting the feedrate of the machine, upon determining that a velocity required for a positioner to move the retroreflector to a desired position exceeds a certain segment feedrate threshold, such that an incident beam of light can maintain constant contact with the retroreflector throughout movement of the machine from the first position and the second position. In some embodiments, the positioner includes one or more of the following motors: an azimuth motor and an elevation motor. The rotational axis of the azimuth motor is perpendicular to the rotational axis of the elevation motor. In various embodiments, adjusting the feedrate of the machine includes limiting the feedrate of the machine for a segment ($F_{i,k}$) to a value determined by the equation:

$$F_{i,k} = \min\left(\frac{mag * velMax}{dC2}, \frac{mag * velMax}{dB2}, normFeed\right)$$

where mag is a distance traveled by the machine from a start-point to an end-point of the segment, where velMax is a maximum rotary velocity of the one or more motors of the positioner, where dC2 is a degree of rotation of the azimuth motor required to adjust the retroreflector for the segment, where dB2 is a degree of rotation of the elevation motor required to adjust the retroreflector for the segment, and where normFeed is the maximum feedrate of the machine. In some embodiments, adjusting the feedrate of the machine comprises predetermining the feedrate path of the machine before a calibration phase occurs. Alternatively, and/or additionally, adjusting the feedrate of the machine occurs automatically in real-time. In such embodiments, the method may further comprise detecting reflections of the beam of light from the retroreflector, and determining the position of a portion of the machine based upon the reflected light.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features. These and other embodiments are described further below with reference to the figures.

DETAILED DESCRIPTION

Figure 1:
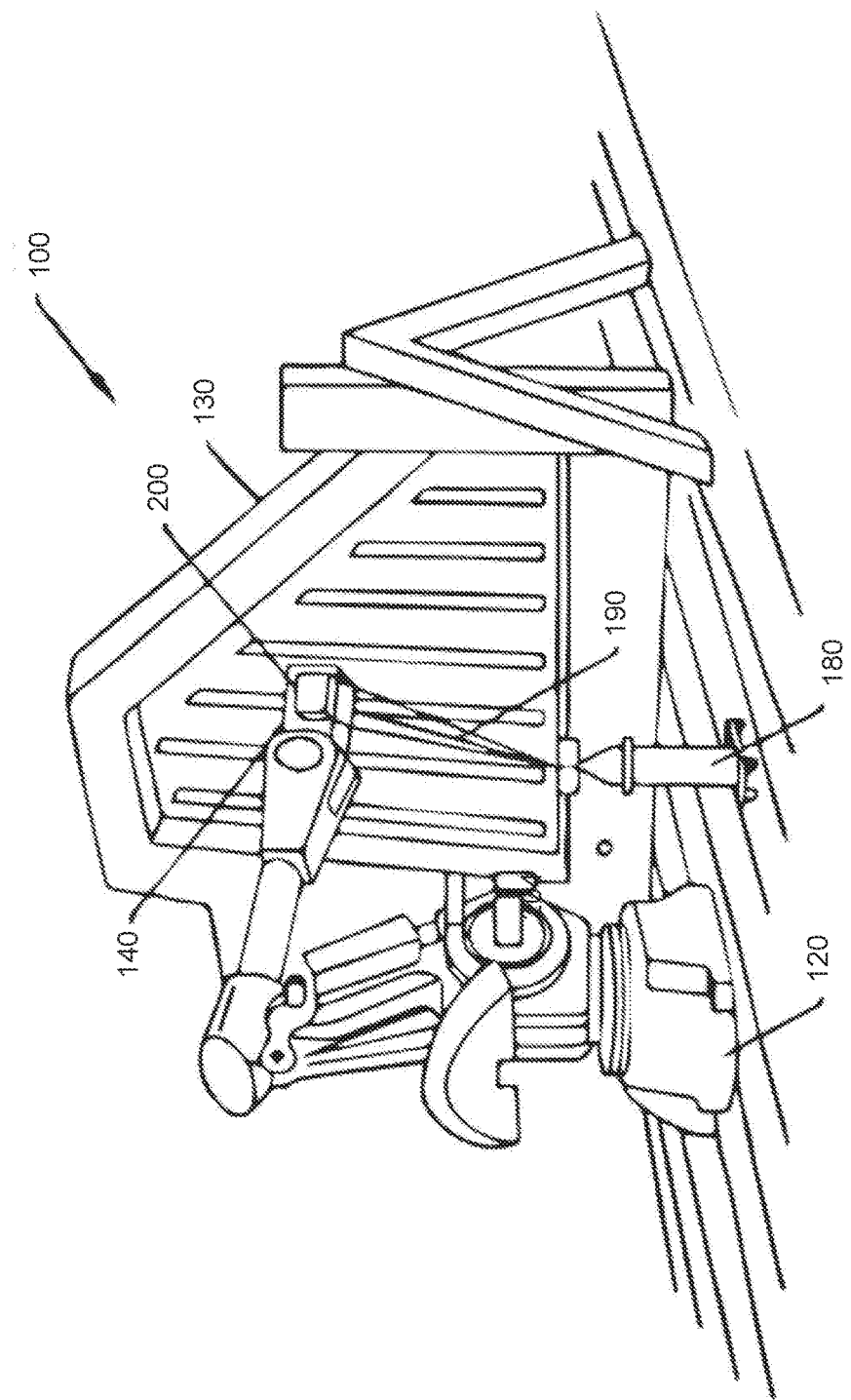
FIG. 1 is a schematic representation of a machine system that includes a plurality of steerable retroreflective systems, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular machine systems, such as systems used for aircraft fabrication or tooling. However, it should be noted that the techniques and mechanisms of the present disclosure apply to various other position tracking systems. As used herein, the term "retroreflective system" may be used synonymously with "active tracker." In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The present disclosure describes a novel machine system with improved retroreflective systems and laser tracking techniques. Specifically, a machine system may include a machine capable of movement in at least one direction and a steerable retroreflective system mounted upon the machine for movement therewith, during a calibration phase. The machine system is capable of determining the position of the machine and the retroreflective system based on programmed machine instructions. The machine system may implement a pre-process to determine optimal feedrates to adjust the machine movements in order to ensure that the retroreflective system is capable of making the appropriate adjustments during a calibration phase in order to maintain constant contact with at least one ray of a beam of light from a light source. This pre-process may be implemented prior to various machining processes to improve performance and accuracy during a calibration phase. In some embodiments the calibration phase occurs before the machine is implemented in any machining and/or tooling process. Alternatively, and/or additionally, the machine system may automatically monitor and adjust the velocity of the machine movement in real-time by illuminating the retroreflective system and receiving reflections therefrom during the machining and/or tooling process. A process controller may implement various algorithmic functions and calculations, including inverse kinematics and machine tool kinematics for retroreflector and laser tracker axis positions to calculate precise machine tool feedrates to maximize measurement productivity and prevent loss of contact with the light source.

The improved system has many advantages in comparison with conventional laser tracking systems. For example, the disclosed machine system can segment the programmed machine movements and predict movement requirements of the retroreflective system in order to maintain optical contact with the light source, and accordingly reduce or increase the velocity of a machine arm endpoint where the retroreflective system is coupled. This eliminates the need for a machine tool operator to manually observe the position and velocity of the retroreflective system and to manually adjust feedrates with a feedrate override on the machine tool controller. One having ordinary skill in the art would recognize that having a break in line of sight when calibrating the machine and/or machining complicated structures would require significant time for recalibration and decrease productivity of a machining process. Furthermore, eliminating the need for a machine tool operator reduces error due to human-machine interaction, decreases labor need, and shortens machine tool measurement times. Finally, adjustment of machine tool feedrate functions as an additional mechanism, in conjunction with improved reflective structures and mobility of retroreflective systems, to ensure optical contact between the retroreflective system and a light source. Overall, the improved system and methods may result in faster machine tooling times and more accurate machine tool measurements.

Example Embodiments

To better understand various aspects of a mounted retroreflector system, a brief description of a machine system with a mounted retroreflector is now presented. FIG. 1 is a schematic representation of a machine system that includes a plurality of steerable retroreflective systems 200, in accordance with some embodiments. As shown somewhat generically in FIG. 1, the machine system 100 includes a machine 120, such as a robotic arm, a machine tool, or other mechanical positioning device. For example, the machine can be a computer numeric control (CNC) device, such as a robotic drilling machine or the like. For purposes of illustration, however, the machine is depicted relatively generically and is capable of movement in multiple directions and about multiple axes, i.e., the machine has multiple degrees of freedom. Although not necessary for the practice of the present disclosure, the machine includes an end effector 140 for holding a tool, such as a drill bit or the like. Although the steerable retroreflective system 200 of the present disclosure can be employed in conjunction with various machines, one embodiment of machine system 100 with which the steerable retroreflective system can be utilized is the SOMaC system as described by U.S. Pat. No. 5,903,459, the contents of which have been incorporated herein.

In various embodiments, retroreflective system 200 may include a retroreflector for reflecting light from a light source as further described below, and with reference to FIG. 2. In other embodiments, machine system 100 may include one or more steerable retroreflective systems 200 mounted upon respective portions of the machine 120. For example, steerable retroreflective systems 200 can be mounted upon opposite sides of end effector 140 of machine 120 to insure that at least one retroreflector is within view at all times. In other embodiments, steerable retroreflective systems 200 can be mounted upon other portions of machine 120 or upon the work piece or part 130 without departing from the spirit and scope of the present disclosure.

In some embodiments machine system 100 may also include laser measurement system (LAS) 180, i.e., laser tracker, which operates as a light source for illuminating steerable retroreflective system 200. In some embodiments, machine system 100 can include two or more laser trackers. Real-time three dimensional laser measurement systems 180 are state of the art measurement systems that obtain large quantities of accurate three dimensional data in a rapid fashion. Such laser measurement systems 180 may typically include an absolute ranging capability and a motorized angle steering head to steer the laser beam. Laser measurement system 180 may also include a feedback system that controls the steering by continually driving a laser beam to follow or track the retroreflector. As shown in FIG. 1, laser beam 190 emitted by laser measurement system 180 is directed from the laser tracker head toward steerable retroreflective system 200 mounted on end effector 140 of machine 120. In some embodiments, by measuring the return beam, the laser tracker head of laser measurement system 180 can determine both the distance and the direction to the retroreflector (i.e., both the horizontal and vertical angles, as well as the range) during various machining processes, including a calibration phase. These three measurements, i.e., range, horizontal angle, and vertical angle, may establish a spherical coordinate system that can be easily transformed into a Cartesian coordinate system. In some embodiments, a variety of commercially available or custom built laser trackers can be employed.

During a machining operation, including a calibration phase thereof, in some embodiments, part 130 is generally held in a fixed position, as shown in FIG. 1. Machine 120 may then be positioned proximate to part 130 such that the tool carried by end effector 140 can contact and machine part 130, as desired. In order to precisely determine the position of end effector 140, laser measurement system 180 may illuminate the end effector and, in particular, steerable retroreflective system 200 carried by end effector 140. As will be apparent, the machine will frequently reposition the end effector during the machining process, including calibration thereof. In conventional machine systems 100 that include a retroreflector mounted upon end effector 140, an end effector 140 would frequently be moved such that laser beam 190 would no longer be within the acceptance angle defined by the retroreflector. In some embodiments, part 130 is not included during a calibration phase. During the calibration phase, the precision and/or consistency of machine movements made by machine 120 implementing machine instructions may be measured using laser measurement system 180 and steerable retroreflective system 200.

According to the present disclosure, steerable retroreflective system 200 may include one or more motors in order to steer the retroreflector through a wide range of angles, thereby providing a much larger effective acceptance angle than conventional retroreflectors. For example, steerable retroreflective system 200 may have an acceptance angle exceeding 320°. The area outside the acceptance angle is therefore a conic that subtends an angle that is less than 40°.

As such, the steerable retro reflective system can continue to receive laser beam 190 emitted by laser measurement system 180 even as end effector 140 is moved into various positions. Accordingly, machine system 100 of FIG. 1 can determine and/or confirm the position of the retroreflector and, in turn, the position of end effector 140 in almost all of the positions that end effector 140 will assume. However, as previously described, movement of machine 120 to different axis positions may still cause laser beam 190 to fall outside the acceptance angle of retroreflective system 200 with steering capabilities where the feedrate of machine 120 surpasses the axis velocity of the rotary axes of the retroreflective system 200 and/or laser measurement system 180.

Figure 2:
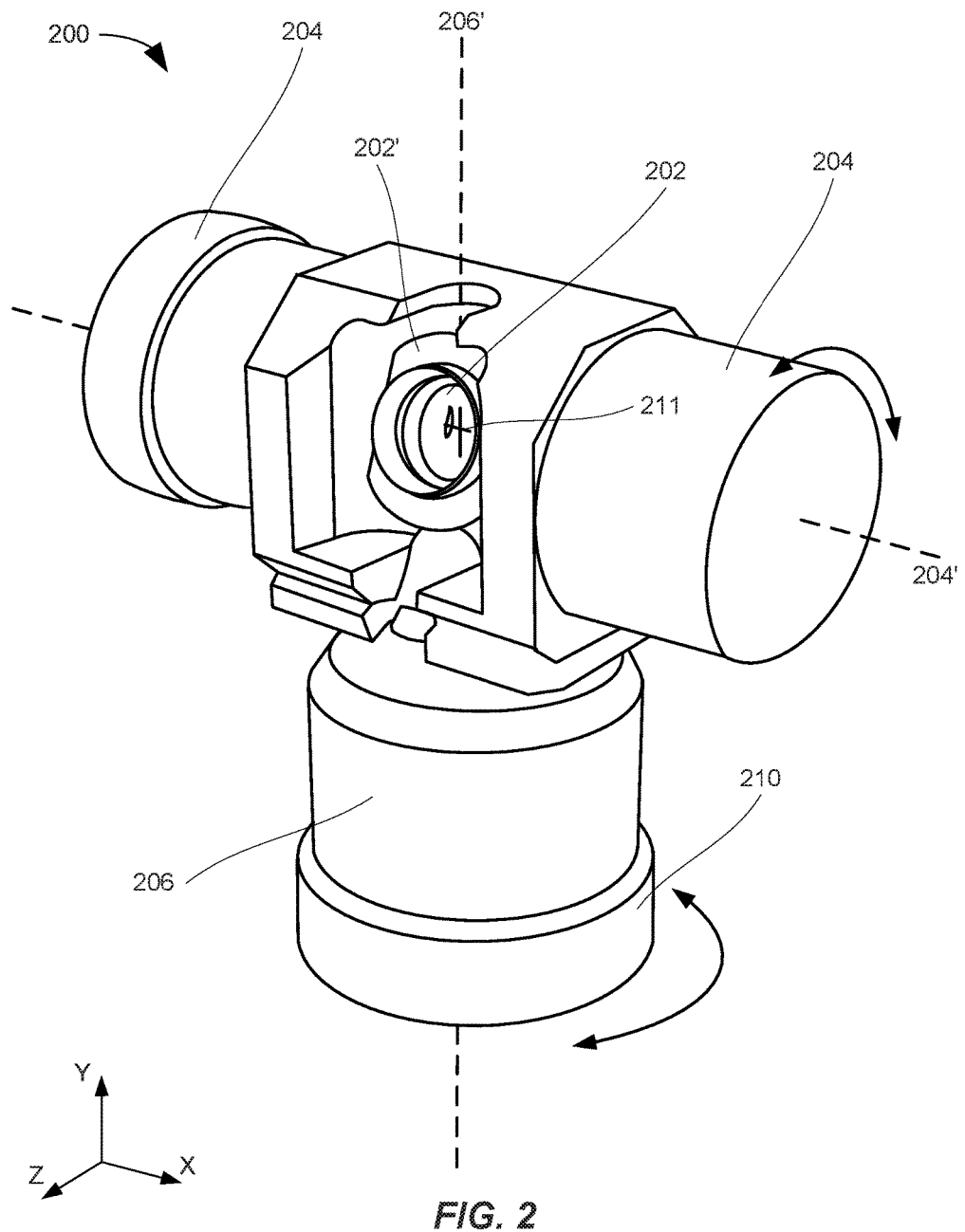
FIG. 2 is a schematic illustration of a steerable retroreflective system, in accordance with some embodiments.

FIG. 2 is a schematic illustration of a steerable retroreflective system 200, such as that previously described in FIG. 1, in accordance with some embodiments. In various embodiments, steerable retroreflective system 200 includes a retroreflector 202 for reflecting some of the light that is incident thereupon. See, for example, the steerable retroreflective systems described in U.S. Pat. No. 6,392,222 entitled "MACHINE SYSTEM HAVING OPTICAL END-POINT CONTROL AND ASSOCIATED METHOD," the contents of which are also incorporated herein. In some embodiments, retroreflector 202 includes a trihedral prism having an input surface through which incident light is received and a plurality of reflective surfaces for reflecting the incident light. As known to those skilled in the art, the reflective surfaces are generally mirrored to facilitate reflection of the incident light. However, retroreflector 202 may be designed to permit a portion of the incident light to escape from retroreflector 202 without being reflected thereby. For example, the trihedral prism may define a window opposite the input surface such that the plurality of reflective surfaces converges at the window. The window is at least partially transmissive such that light incident upon the window passes therethrough and escapes from the trihedral prism. In order to permit the light to leak through the window, the window is preferably free of any mirrored coating.

For a window of a given transmissivity, the percentage of the incident light that is allowed to leak through the window is defined by the size of the window relative to the input surface of the trihedral prism. For example, the window may be sized such that between about 0.5% and 5% of the light received through the input surface of the trihedral prism passes through the window. In some embodiments, the window is sized such that about 1% of the light received through the input surface of the trihedral prism passes through the window. In various embodiments, retroreflector 202 can be constructed so as to permit a predetermined percentage of the incident light to leak therethrough in a variety of manners. For example, apex of a trihedral prism may be truncated or removed. See, for example, the trihedral prism structures described in U.S. Pat. No. 6,392,222.

Various other types of retroreflectors may be used in other embodiments of retroreflective system 200. Another type of retroreflector is a hollow corner cube retroreflector that is constructed of three mutually orthogonal mirrors. Although the lateral displacement between the incident and reflected beams does not vary as a function of the incidence angle, a hollow corner cube retroreflector is generally relatively difficult to manufacture and is accordingly more expensive than a comparable trihedral prism reflector. In addition, hollow corner cube retroreflectors typically have an acceptance angle of +/−25°. A third type of retroreflector is a cat eye in which several hemispherical lenses are bonded to form a single optical element. While a cat eye has a larger acceptance angle, such as about +/−60°, a cat eye is significantly more expensive than a trihedral prism retroreflector or a hollow corner cube retroreflector. While a cat eye has a much greater acceptance angle than a trihedral prism retroreflector or a hollow corner cube retroreflector, the acceptance angle of a cat eye is still insufficient in many situations, particularly in many high precision manufacturing operations in which the retroreflector will be mounted upon the end effector of a robot or other machine tool that will assume many different positions during the manufacturing process.

In some embodiments, steerable retroreflective system 200 may also include an optical detector, such as a photocell, for detecting the leakage light that passes through the retroreflector 202. In some embodiments, such optical detector detects the relative position of the leakage light such that the incidence angle α can be determined. Steerable retroreflective system 200 also includes a controller, such as process controller 402 (further described below in conjunction with FIG. 4), such as a microprocessor or the like, for receiving signals from the optical detector and for determining the incidence angle. In this regard, the controller 402 can determine the incidence angle α by the following equation: $\alpha = \tan^{-1}(d/D)$ wherein D is the predetermined separation distance between the optical detector and the virtual apex 211 of the retroreflector and d is the offset of the leakage light that passes through retroreflector 202 from the center or other reference location defined by the optical detector. In some embodiments, retroreflective system 200 and associated positioners and/or motors may be governed by a retroreflective system controller separate from controller 402. In some embodiments, controller 402 may issue commands to, and receive status information of a retroreflective system from, such retroreflective system controller.

In some embodiments, retroreflector 202 and the optical detector are typically mounted within a housing, such as retroreflector housing 202'. Housing 202', in turn, is mounted to the object to be monitored, such as the end effector 140 of a machine, such as machine 120 or the work piece 130, so as to move therewith. However, in other embodiments, retroreflector 202 can also be controllably positioned relative to the object to be monitored. In this regard, steerable retroreflective system 200 includes means for controllably steering retroreflector 202 in response to the leakage light detected by the optical detector. In some embodiments, the means for controllably steering the retroreflector includes at least one positioner for moving the retroreflector and a retroreflective system controller, such as the microprocessor described above, that directs at least one positioner to controllably steer retroreflector 202 in response to the leakage light detected by the optical detector.

In various embodiments, the positioner may include one or more motors for moving retroreflector 202 about respective axes. For example, the means for controllably steering retroreflector 202 can include elevation motor 204. In some embodiments, elevation motor 204 may be a stepper motor having a shaft connected to the retroreflector housing 202' in which retroreflector 202 and the optical detector are disposed. As such, the retroreflective system controller can actuate elevation motor 204 so as to rotate the shaft and, in turn, rotate retroreflector 202 about elevation axis 204'. In addition, the means for controllably steering retroreflector 202 can include azimuth motor 206. Similarly, azimuth motor may be a stepper motor, having a shaft connected to housing 202'. As such, the retroreflective system controller can actuate azimuth motor 206 so as to rotate the shaft and, in turn, reflector housing 202' that includes retroreflector 202 and the optical detector. In particular, azimuth motor 206 rotates retroreflector 202 about azimuth axis 206' defined by the shaft of azimuth motor 206. In other embodiments, elevation motor 204 and/or azimuth motor 206 may comprise various other motor types, such as a DC motor, a servo motor, etc.

In some embodiments, the axes 204' and 206' defined by the shafts of the elevation motor and azimuth motor, respectively, intersect at apex 211 of retroreflector 202 such that apex 211 of retroreflector 202 remains in the same position and the remainder of the retroreflector is pivoted thereabout upon actuation of the elevation motor 204 and/or azimuth motor 206. As further depicted in FIG. 2, azimuth motor may be mounted to a motor mount 210 which, in turn, is fixed to the object to be monitored, such as the end effector 140 of machine 120, 120a, and 120b shown schematically in FIG. 1 and FIGS. 3A-3B. As such, the controlled actuation of the elevation and azimuth motors can controllably steer the retroreflector relative to the object upon which steerable retroreflective system 200 is mounted. In some embodiments, the retroreflective system controller is preferably in electrical communication with each of the elevation motor 204 and azimuth stepper motor 206 so as to controllably actuate the motors. In other embodiments, steerable retroreflective system 200 can include other means for controllably steering retroreflector 202 without departing from the spirit and scope of the present disclosure.

Retroreflector 202 can be steered in any manner desired by the operator of machine system 100, as described below. For example, the retroreflector can be steered in an open loop fashion through a sequence of positions, each of which is defined in advance. Alternatively, the retroreflector can be steered by a retroreflective system controller in a closed loop fashion so as to follow or track the incident light. In this respect, the steerable retroreflective system 200 can track the incident light in a variety of fashions. In some embodiments, for example, the optical detector may define a target zone and the retroreflective system controller steers retroreflector 202 to maintain the leakage light within the target zone. By maintaining the leakage light within the target zone, the retroreflective system controller may also steer retroreflector 202 to follow the incident light.

Examples of Machine Systems

Figure 3A:
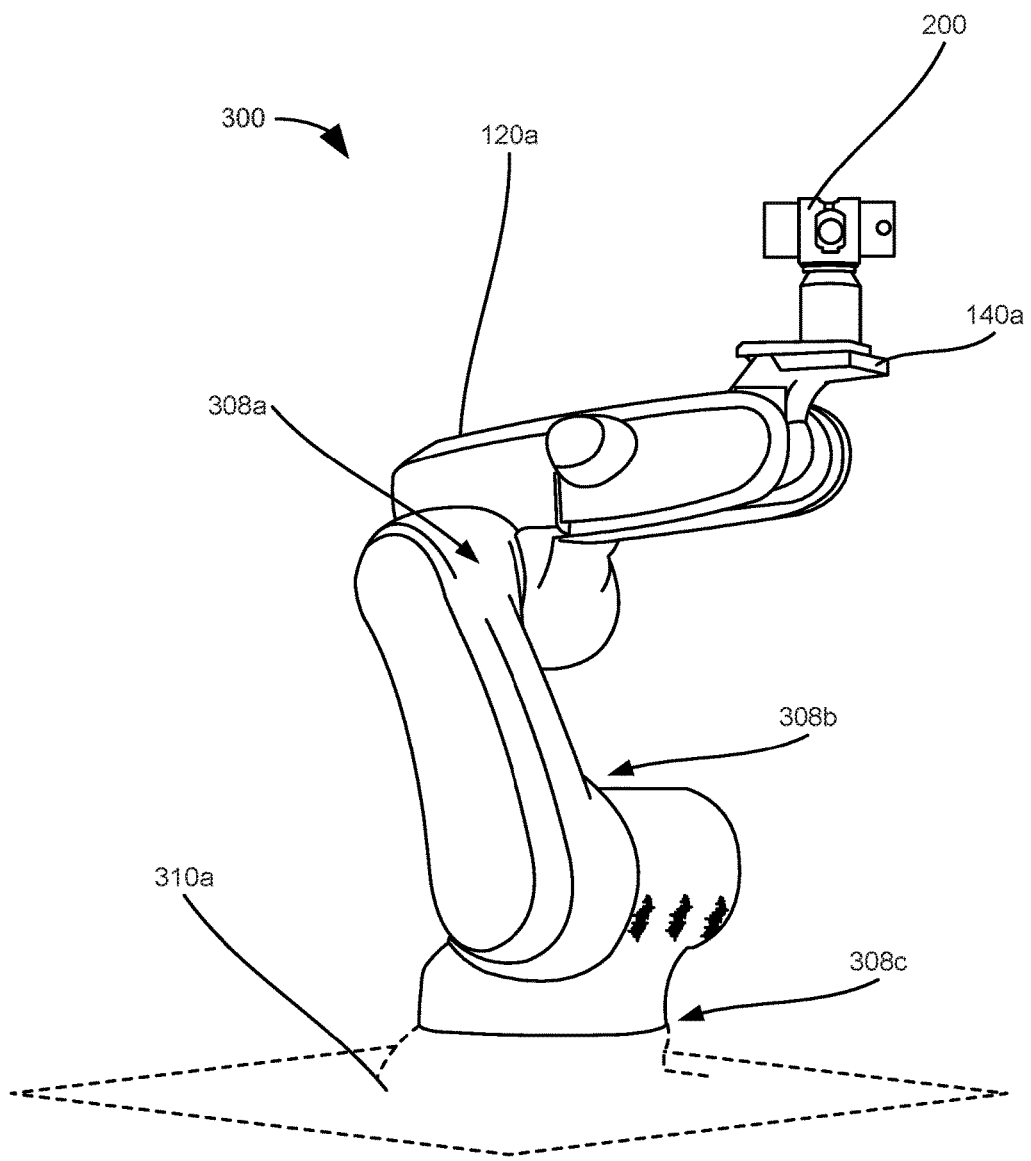
FIG. 3A is a schematic illustration of a machine system including a steerable retroreflective system mounted to a machine, in accordance with some embodiments.
Figure 3B:
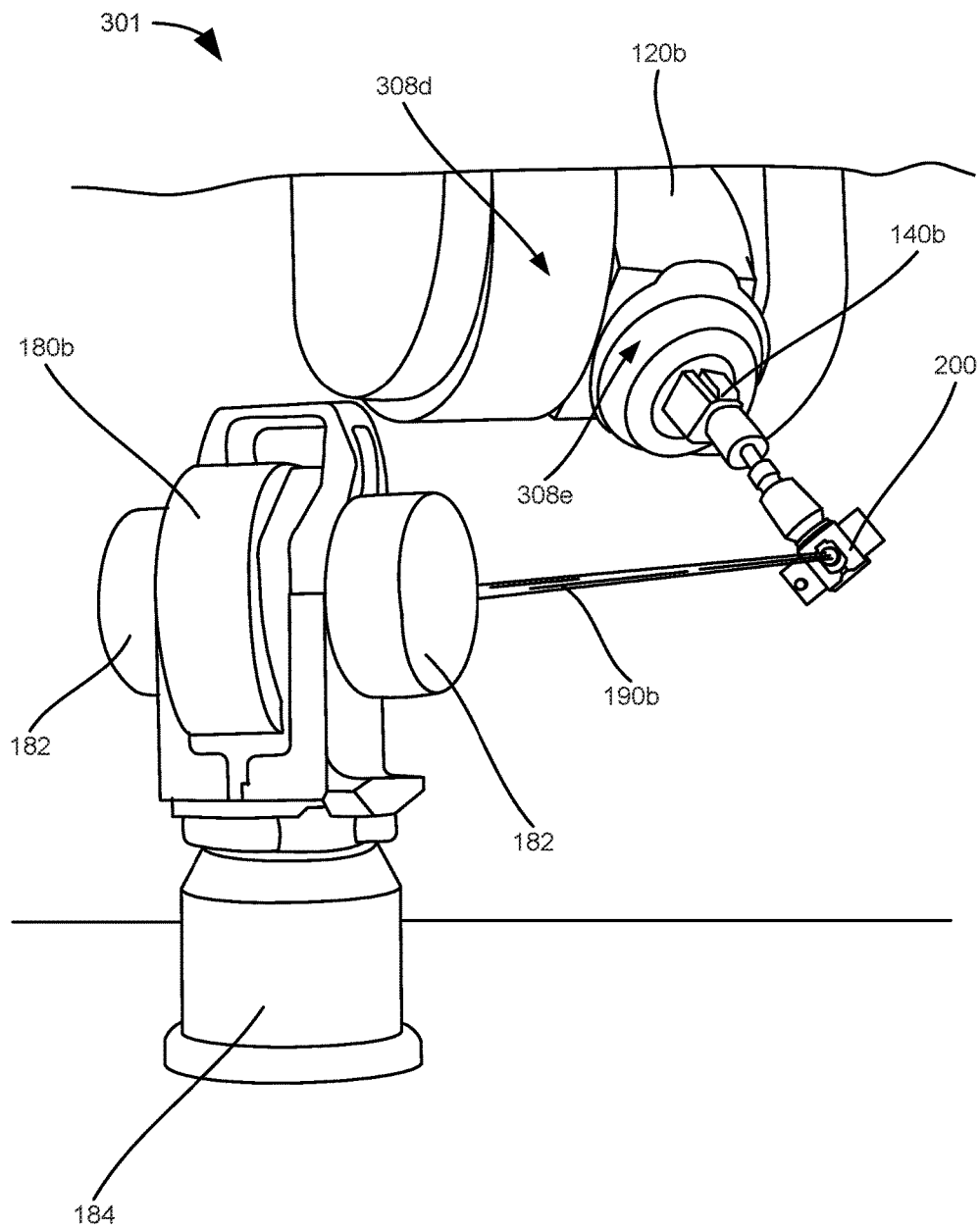
FIG. 3B is schematic illustration of a machine system including a mounted steerable retroreflective system illuminated by a light source, in accordance with some embodiments.

The following figures provide additional examples of machine systems, such as machine system 100 previously described in conjunction with FIG. 1. FIG. 3A is a schematic illustration of a machine system 300 including a steerable retroreflective system mounted to a machine, in accordance with some embodiments. In various embodiments, machine system 300 includes steerable retroreflective system 200 mounted to end effector 140a of machine 120a. In some embodiments, end effector 140a may be end effector 140 and machine 120a may be machine 120. As depicted in FIG. 3A, machine 120a is configured as a robotic arm mounted to a fixed motor mount 310a, and comprises one or more rotatable joints, including joints 308a, 308b, and 308c, which allow movement of robotic arm 120a in multiple directions and about multiple axes, such as machine 120. FIG. 3B is schematic illustration of a machine system 301 including a mounted steerable retroreflective system illuminated by a light source, in accordance with some embodiments. In various embodiments, system 301 includes steerable retroreflective system 200 mounted to end effector 140b of machine 120b. In some embodiments, end effector 140b may be end effector 140 and machine 120b may be machine 120. As depicted in FIG. 3B, machine 120b is configured with one or more rotatable joints, including joints 308d and 308e, which allow movement of machine 120b in multiple directions and about multiple axes, such as machine 120.

Additionally, machine system 301 may include laser measurement system 180b that illuminates a retroreflector of steerable retroreflective system 200 with laser beam 190b. Laser measurement system 180b may be laser measurement system 180 previously described in conjunction with FIG. 1. In some embodiments, laser measurement system 180b may include elevation motor 182 and azimuth motor 184 for movement in multiple directions and about multiple axes.

Figure 4:
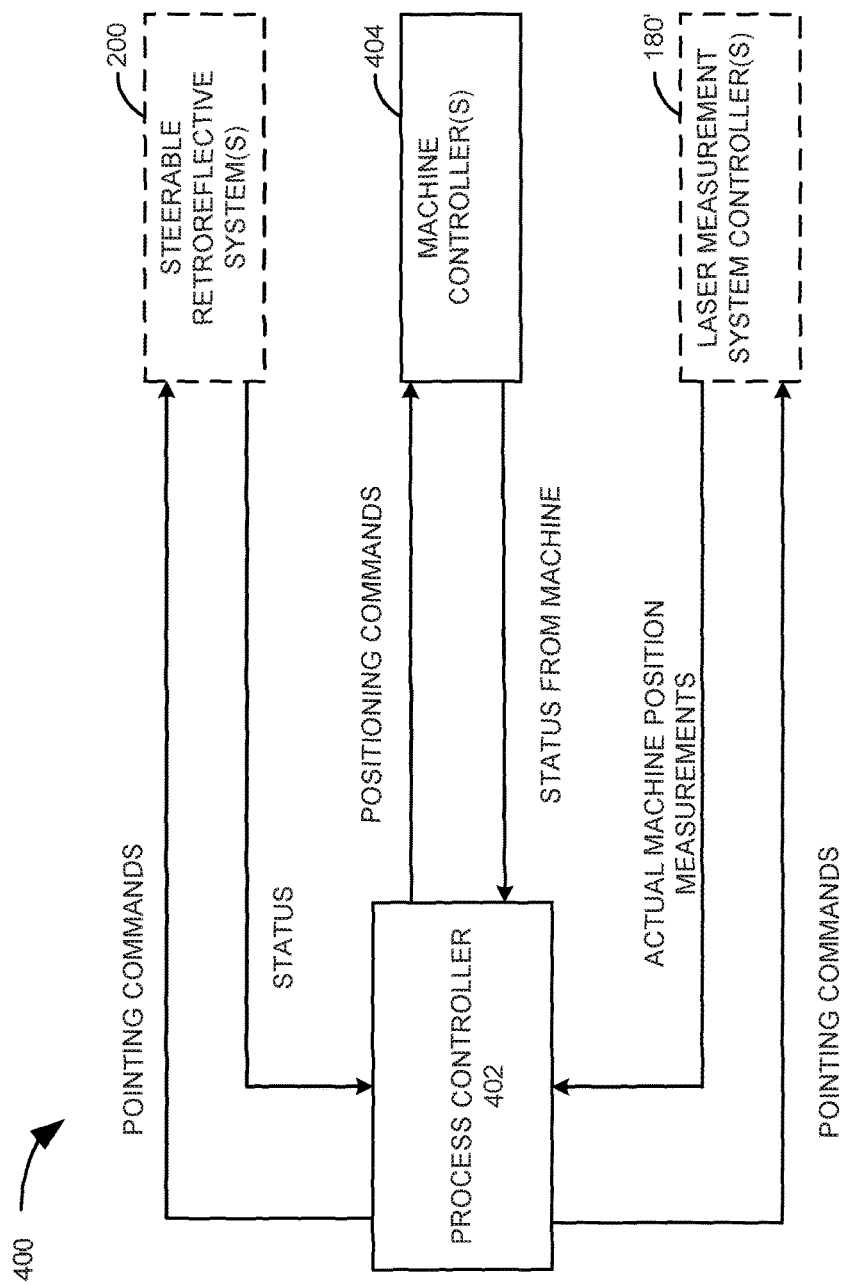
FIG. 4 is a schematic representation of a machine system of one embodiment of the present disclosure that indicates the interrelationship between the various components and the signals that pass therethrough.

FIG. 4 is a schematic representation of a machine system 400 of one embodiment of the present disclosure that indicates the interrelationship between the various components and the signals that pass therethrough. Dashed lines within FIG. 4 indicate optional operations and/or components to system 400. In some embodiments, machine system 400 may be implemented as machine system 100 previously described in conjunction with FIG. 1, and/or machine systems 300 and/or 301 previously described in conjunction with FIGS. 3A-3B. In some embodiments, machine system 400 is implemented during a calibration phase of a machining and/or tooling process. In some embodiments, the components shown in FIG. 4 may be connected via a wireless and/or wired network. In some embodiments, machine system 400 may also include one or more laser measurement systems, such as laser tracker 180, each of which includes, among other components, a laser measurement system controller 180' that steers the laser beam 190 by driving motors 182 and 184, or other motorized angle steering head. As such, the process controller 402 can provide commands to laser measurement system controllers 180' in order to dictate the direction in which the laser beam is to be steered. Based upon the signals reflected from respective retroreflectors 202, laser measurement system controllers 180' can determine the actual position of retroreflectors 202 and, in turn, the actual position of the portion of machine 120 or part 130 upon which retroreflectors 202 are mounted.

As shown in FIG. 4, the laser measurement system controllers can then transmit signals indicative of the actual position of retroreflectors 202 to process controller 402. Based upon the signals indicative of the actual position of retroreflectors 202 and, in turn, the actual position of the portions of machine 120 or part 130 upon which retroreflectors 202 are mounted, process controller 402 can modify the commands transmitted to machine controllers 404 that direct the movement of the respective machines in order to compensate for differences between the actual position of machine 120 and the predicted position of machine 120 as contemplated by the CNC program, during the machining process, including a calibration phase thereof. By compensating for differences between the actual position of machine 120 and the anticipated position of machine 120, machine systems, such as systems 100, 300, and/or 301, the present disclosure can machine parts more accurately than conventional machine systems. In this regard, changes that occur to part 130 and/or machine 120 such as changes that occur as a result of temperature fluctuations, for example, can be accommodated by modifying the commands transmitted from process controller 402 to machine controller 404 that direct the movement of the respective machines, such as machines 120, 120a, and/or 120b.

In some embodiments, a single process controller 402 may communicate directly with steerable retroreflective system 200, machine 120, and laser measurement system 180, or any combination thereof. However, as shown in FIG. 4, system 400 may not include steerable retroreflective system 200 and/or laser measurement system controller 180' in various embodiments. As previously described, steerable retroreflective system 200 may be governed by a separate retroreflective system controller (not shown) that may or may not communicate with process controller 402. Similarly, laser measurement system 180 and laser measurement system controller 180' may comprise a separate system that may or may not communicate with process controller 402. For example, process controller 402 and machine controllers 404 comprise a separate system that does not communicate with laser measurement system controller 180' and/or steerable retroreflective system 200, and corresponding retroreflective system controller. Instead, data from each system may be analyzed and applied offline to establish the CNC final path commands.

Machine system 100 of the present disclosure can be employed in a variety of applications. For example, the machine system can be utilized with a single steerable retroreflective system 200 mounted upon a machine 120 and a single laser measurement system 180 in order to measure the XYZ position of a retroreflector, such as retroreflector 202, according to either a static mode or a dynamic mode. In the static mode, the machine system of the present disclosure can measure the position of retroreflector 202 and, in turn, the position of the portion of the machine 120 upon which retroreflector 202 is mounted. In the dynamic mode, machine system 400 repeatedly measures the position of retroreflector 202 and, in turn, the position of the portion of machine 120 upon which retroreflector 202 is mounted so as to effectively monitor the path along which the machine is moving. In this embodiment in which machine system 400 includes a single steerable retroreflector system 200 and a single laser measurement system 180, the steerable retroreflective target will generally be operated in a closed loop mode so as to track the laser beam emitted by laser measurement system 180. As such, machine 120 can move over much greater distances and can assume many more orientations while continuing to receive the laser beam emitted by laser measurement system 180 within the acceptance angle defined by the retroreflector 202.

In other embodiments, machine system 100 may include a single laser measurement system 180 and a plurality of steerable retroreflective targets 200 mounted upon different portions of a machine 120. In order to illuminate each of these steerable retroreflective systems, the laser measurement system is preferably driven by the process controller 402 to sequentially illuminate respective retroreflectors 202, each of which is steered toward the laser measurement system in the manner described above. By measuring the relative positions of the plurality of retroreflectors, the machine system of this embodiment can advantageously determine the XYZ position of the machine as well as the pitch, yaw and roll of the machine either in a static mode, i.e., in a specific position, or a dynamic mode as the machine moves along the path of travel.

Conversely, the machine system 100 can include a plurality of laser measurement systems 180 and a single steerable retroreflective system 200 mounted upon the machine 120. In this regard, the process controller 402 preferably commands the steerable retroreflective system 200 to sequentially point toward and track different at least one of the plurality of laser measurement systems 180. As such, the steerable retroreflective system 200 can operate in a closed-loop manner to track a particular laser measurement system until commanded by process controller 402 to point toward another laser measurement system 180 at which point in time, the steerable retroreflective system 200 begins to operate in an open-loop fashion so as to be moved toward the other laser measurement system. Once the steerable retroreflective system 200 is pointing toward the other laser measurement system 180, the steerable retroreflective system 200 can again operate in a closed-loop mode in order to track the other laser measurement system 180. The machine system of this embodiment can therefore also measure the XYZ position of machine 120 as well as the pitch, yaw and roll of machine 120, either statically or dynamically.

Further, machine system 100 can include both a plurality of laser measurement systems 180 and a plurality of steerable retroreflective systems 200. While the machine system of this embodiment can be configured in a variety of manners, the machine system could be configured such that each laser measurement system 180 is assigned to illuminate a specific steerable retroreflective system 200 in order to reduce the time required to measure the positions of a plurality of retroreflectors 202. Alternatively, the machine system 100 could direct each laser measurement system 180 to identify the most accessible retroreflector 202 and to then measure the position of that retroreflector. In any event, the machine system of this embodiment can measure the XYZ position of machine 120 and the pitch, yaw and roll of machine 120, either statically or dynamically, in real time or near real time.

Adjusting Machine Movement Feedrate to Maintain a Constant Beam of Light Incident Upon a Retroreflector Although steering retroreflector 202 by controller 402 to track the incident light may increase the effective acceptance angle of retroreflective system 200, it is still possible to surpass the axis velocity of the rotary axes of the retroreflective system 200 and/or laser measurement system 180, when machine 120 is moved to different axis positions, and/or three dimensional points in space. This issue may arise especially when the rotary axes 204' and 206' of retroreflector 202 pass a singularity point. For example, the rotary axes 204' and 206' may reach a singularity point where the vector of the incoming laser beam 190 is collinear with the centerline of azimuth rotation axis 206'. In this position, a very small change in the movement of machine 120 may result in a large change required in rotation by the azimuth rotation axes 206' for retroreflector 202 to remain in optical contact with laser beam 190. By segmenting the movement of machine 120 and limiting the feedrate, or the velocity at which the end effector moves, for discrete segments, it is possible to limit the feedrate of machine 120 to match the rotational alignment capability constraints of retroreflective system 200 and/or laser measurement system 180.

In some embodiments, process controller 402 may implement a pre-process to segment machine instructions for movement of machine 120, prior to the machining process, including a calibration phase thereof. For example, machine instructions may include 200 lines of instructions for movement of machine 120 into various machine positions. Such instructions can further include instructions for segmenting movement of machine 120 from one machine position to another. The more segments defined, the more accurate the predictions of the rotary axes velocities of retroreflective system 200 required to maintain optical contact between retroreflector 202 and laser management system 180, and the more accurate the limiting feedrate can be calculated for machine system 100.

In various embodiments, the machine axis position, P, may contain points X, Y, Z, C, and/or A, where each point represents the position of an axis of a rotatable joint of machine 120 such that:

$$P=[XYZ]^T$$

In some embodiments, variables C and A refer to rotary axes of a machine system that control an end effector, such as end effector 140b in system 301. C refers to the azimuth angle and A refers to the elevation angle of end effector 140b. Similarly, the axis position of retroreflective system 200, $P_{AT}$, may contain point C2 corresponding to the position of azimuth axis 206' and point B2 corresponding to the position of the elevation axis 204' such that:

$$P_{AT}=[C2\ B2]^T$$

Finally, the position of laser measurement system 180, $P_L$, may include points $X_L$, $Y_L$, and $Z_L$, such that:

$$P_L=[X_L\ Y_L\ Z_L]^T$$

Utilizing forward kinematic transformation, the specific position of machine 120 and a machine tool at end effector 140 may be determined from specified values for joint parameters. For example, with regard to rotation matrices for A-axis, $R_X(\theta_A)$, and C-axis, $R_Z(\theta_C)$, machine coordinates of machine 120 may be:

$$R_x(\theta_A) = \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}$$

$$R_Z(\theta_C) = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

The translation matrix for machine coordinates, $T_Z(X,Y,Z)$, may be:

$$T_Z(X,Y,Z) = \begin{bmatrix} 1 & 0 & 0 & X \\ 0 & 1 & 0 & Y \\ 0 & 0 & 1 & Z \\ 0 & 0 & 0 & 1 \end{bmatrix}$$

The position of retroreflector 202 may further be determined by the A-axis pivot length, pivotLength, and length of the retroreflective system 200, targetLength, where L=pivotLength+targetLength. As such, the translation matrices for the A-axis pivot length and length of the retroreflective system 200, $T_L(L)$, may be:

$$T_L(L) = \begin{bmatrix} 1 & 0 & 0 & 0 \\ 0 & 1 & 0 & 0 \\ 0 & 0 & 1 & L \\ 0 & 0 & 0 & 1 \end{bmatrix}$$

With such variables defined, the forward kinematic transformation matrix, FK, may be determined by the following equation:

$$FK=T_Z(x,y,z)*R_Z(\theta_C)*R_x(\theta_A)*T_L(x,y,z)$$

Utilizing the forward kinematic matrix, FK, tool tip coordinates, p, are determined by:

$$\begin{bmatrix} p_x \\ p_y \\ p_z \\ 1 \end{bmatrix} = FK * \begin{bmatrix} 0 \\ 0 \\ 0 \\ 1 \end{bmatrix}$$

$$p = \begin{bmatrix} p_x \\ p_y \\ p_z \end{bmatrix}$$

The tool axis vector (i,j,k) may be determined by:

$$\begin{bmatrix} i \\ j \\ k \\ 1 \end{bmatrix} = FK * \begin{bmatrix} 0 \\ 0 \\ 0 \\ 1 \end{bmatrix}$$

$$toolVector = \begin{bmatrix} i \\ j \\ k \end{bmatrix}$$

Then by using inverse kinematics, the orientations of the axes of retroreflective system 200 in 3-dimensional space are determined. For example, the vector from the retroreflector to the location of laser measurement system 180 may be found by:

$$\begin{bmatrix} i_T \\ j_T \\ k_T \\ 1 \end{bmatrix} = FK^{-1} * P_T$$

$$v = \begin{bmatrix} i_T \\ j_T \\ k_T \end{bmatrix}$$

The magnitude of v is then scaled to get a unit vector with a reverse sign:

$$v=-v/|v|$$

The rotary coordinates, in units of degrees, of retroreflective system 200 may then be computed by the following equations:

$$C2 = \text{atan2}(j_T, i_T) * 180/\pi$$

$$B2 = \text{atan2}\left(\sqrt{i_T^2 + j_T^2}, k\right) * 180/\pi$$

$$P_{AT} = \begin{bmatrix} C2 \\ B2 \end{bmatrix}$$

For each machine position, $P_j$, $$\|P_j - P_{j-1}\| = \begin{bmatrix} dX_j \\ dY_j \\ dZ_j \end{bmatrix}$$

$$mag_j = \sqrt{dX_j^2 + dY_j^2 + dZ_j^2}$$

-continued $$S = \text{ceil}(mag_j/D) - 1$$

Given N as the number of machine positions, j describes the index of the machine position j=1 . . . N. With D as a desired distance for each segment between positions j and j+1, and given S as the number of segments between positions j and j+1, k is the index of segments between each position j and j+1, where k=1 . . . S, and $mag_j$ is the linear distance traveled by machine 120 from a first position to a second position.

Then, for each segment $P_{j,k}$, $$\|P_{j,k+1} - P_{j,k}\| = \begin{bmatrix} dX_{j,k} \\ dY_{j,k} \\ dZ_{j,k} \end{bmatrix}$$

$$\|P_{ATj,k+1} - P_{ATj,k}\| = \begin{bmatrix} dC2 \\ dB2 \end{bmatrix}$$

$$mag_{j,k} = \sqrt{dX_{j,k}^2 + dY_{j,k}^2 + dZ_{j,k}^2}$$

Here, $mag_{j,k}$ is the linear distance traveled by machine 120 from a start-point to an end-point of a given segment. Given a maximum rotary velocity, velMax, of the motors of retroreflective system 200 and a feedrate threshold, norm-Feed, of machine 120, the following equation may be used to determine a value ($F_{i,k}$) to limit thefeedrate, or velocity of the end effector, of machine 120 in order to optimize the machine feedrate in order to maintain optical contact between retroreflector 202 and laser management system 180:

$$F_{i,k} = \min\left(\frac{mag_{j,k} * velMax}{dC2}, \frac{mag_{j,k} * velMax}{dB2}, normFeed\right)$$

where dC2 is a degree of rotation of the azimuth motor required to adjust the retroreflector for the segment, and where dB2 is a degree of rotation of the elevation motor required to adjust the retroreflector for the segment. Thus, ($mag_{j,k}$*velMax)/dC2 represents the maximum rate of movement for machine 120 at which azimuth motor 206 can optimally move the retroreflector from the start-point of the segment to achieve the desired position at the end-point of the segment. Similarly ($mag_{j,k}$*velMax)/dB2 represents the maximum rate of movement for machine 120 at which elevation motor 204 can optimally move the retroreflector from the start-point of the segment to achieve the desired position at the end-point of the segment. In some embodiments the units of $mag_{j,k}$ is distance, e.g. inches. In some embodiments, the units of velMax is degrees over time, e.g. degrees per min. In some embodiments, the units of dC2 and dB2 are degrees. In some embodiments, the units for norm-Feed is distance per time, e.g. inches per minute.

Using this algorithm and associated calculations, process controller 402 may limit the feedrate of machine 120 for a segment ($F_{i,k}$) to the minimum value between ($mag_{j,k}$*velMax)/dC2, ($mag_{j,k}$*velMax)/dB2, and norm-Feed, which determines the maximum feedrate of machine 120 based on rotary velocity constraints of retroreflective system 200. For example, a typical volume for the feedrate threshold, normFeed, of a machine, such as machine 120, may be approximately 300 inches per minute. The maximum rate at which azimuth motor 206 can optimally move retroreflector 202 from the start-point of a first segment to achieve the desired position at the end-point of the first segment may be 400 inches per minute, and the maximum rate at which elevation motor 204 can optimally move retroreflector 202 from the start-point of the first segment to achieve the desired position at the end-point of the first segment is 450 inches per minute. Here, process controller 402 does not need to limit the feedrate of machine 120 to below the feedrate threshold, normFeed, which is 300 inches per minute.

However, if the maximum rate at which azimuth motor 206 and/or elevation motor 204 can optimally move retroreflector 202 from the start-point of a segment to achieve the desired position at the end-point of the segment is slower than 300 inches per minute, process controller 402 will adjust the feedrate of machine 120 accordingly for that particular segment. For example, the maximum rate at which azimuth motor 206 can optimally move retroreflector 202 from the start-point of a second segment to achieve the desired position at the end-point of the second segment may be 250 inches per minute. Here, process controller 402 may issue positioning commands to machine controller 404 (as described in FIG. 4) to slow the feedrate of machine 120 to 250 inches per minute in order to ensure constant contact between retroreflector 202 and laser beam 190 emitted from laser management system 180. If the maximum rate for optimal movement of retroreflector 202 by azimuth motor 206 and/or elevation motor 204 increases beyond the norm-Feed value at a subsequent segment, process controller 402 may then increase the feedrate of machine 120 for the subsequent segment to the feedrate threshold, normFeed.

Such process for segmenting machine movement and adjusting machine feedrate may be more advantageous to existing solutions which require a machine tool operator to manually observe the position and velocity of retroreflective system 200 and use a feedrate override on the machine tool controller 404 to avoid laser beam breaks. The existing systems create error due to human-machine interactions, increase labor need, and prolong machine tool measurement times. In some embodiments, measurement times may be reduced by approximately 50% without the need for a machine tool operator during measurement.

In other embodiments, the process controller 402 may use similar inverse kinematics and machine tool kinematics to calculate the lowest maximum rate at which azimuth motor 184 and/or elevation motor 182 of laser measurement system 180b can optimally adjust laser beam 190b from the start-point of a segment to achieve the desired position at the end-point of the segment. Thus, process controller 402 may limit the feedrate of machine 120 for a segment ($F_{i,k}$) to the minimum value between the feedrate threshold of machine 120b, normFeed, and the maximum rate at which azimuth motor 184 and/or elevation motor 182 can optimally move the laser measurement system 180b from the start-point of the segment to achieve the desired position at the end-point of the segment. In further embodiments, process controller 402 may account for the maximum rate of motors from both the retroreflective system 200 and laser management system 180b for a segment to determine the optimal machine feedrate for that segment.

Figure 5A:
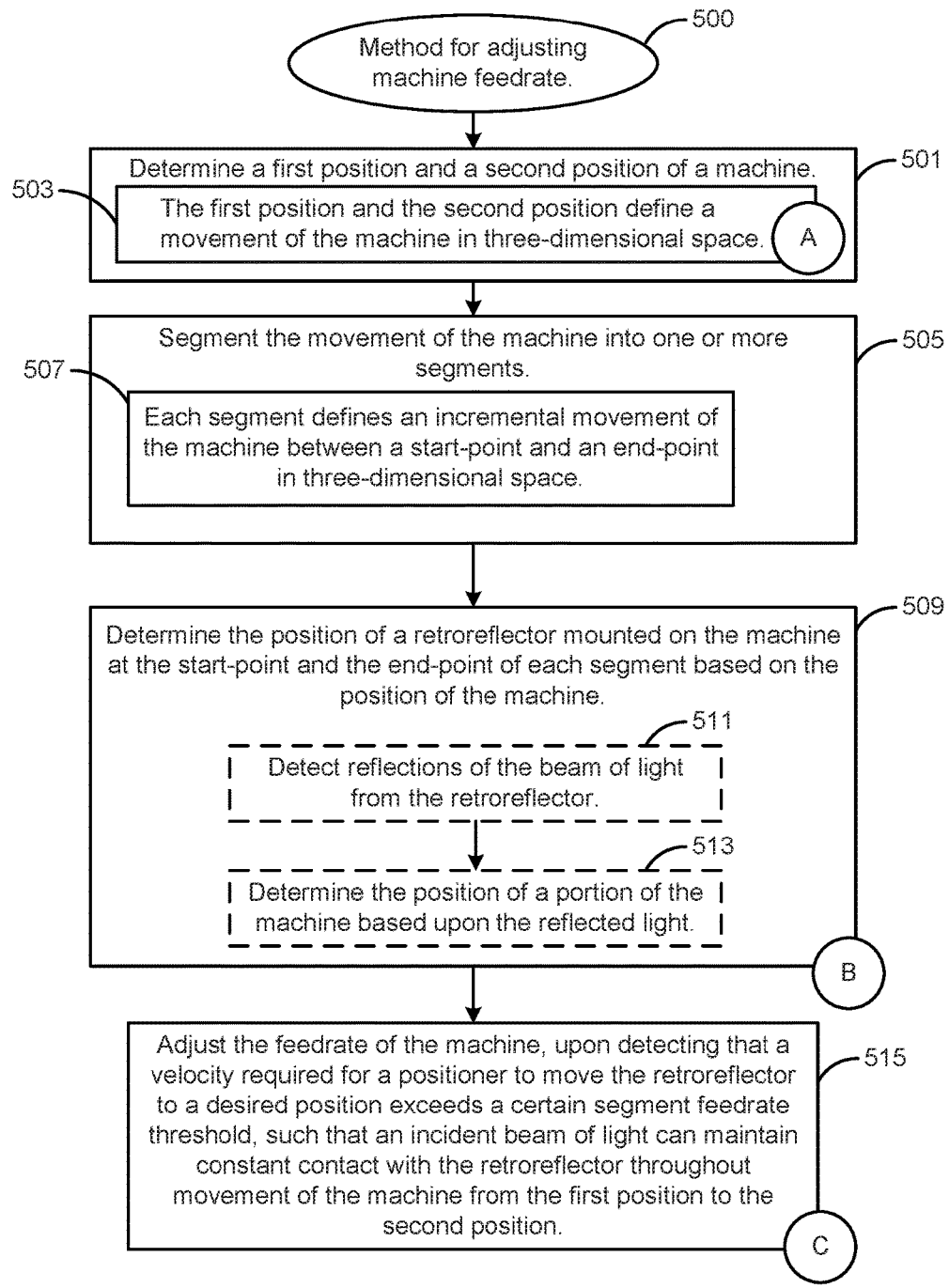
FIGS. 5A-5B illustrate a process flowchart corresponding to a method for adjusting machine feedrate, in accordance with some embodiments.
Figure 5B:
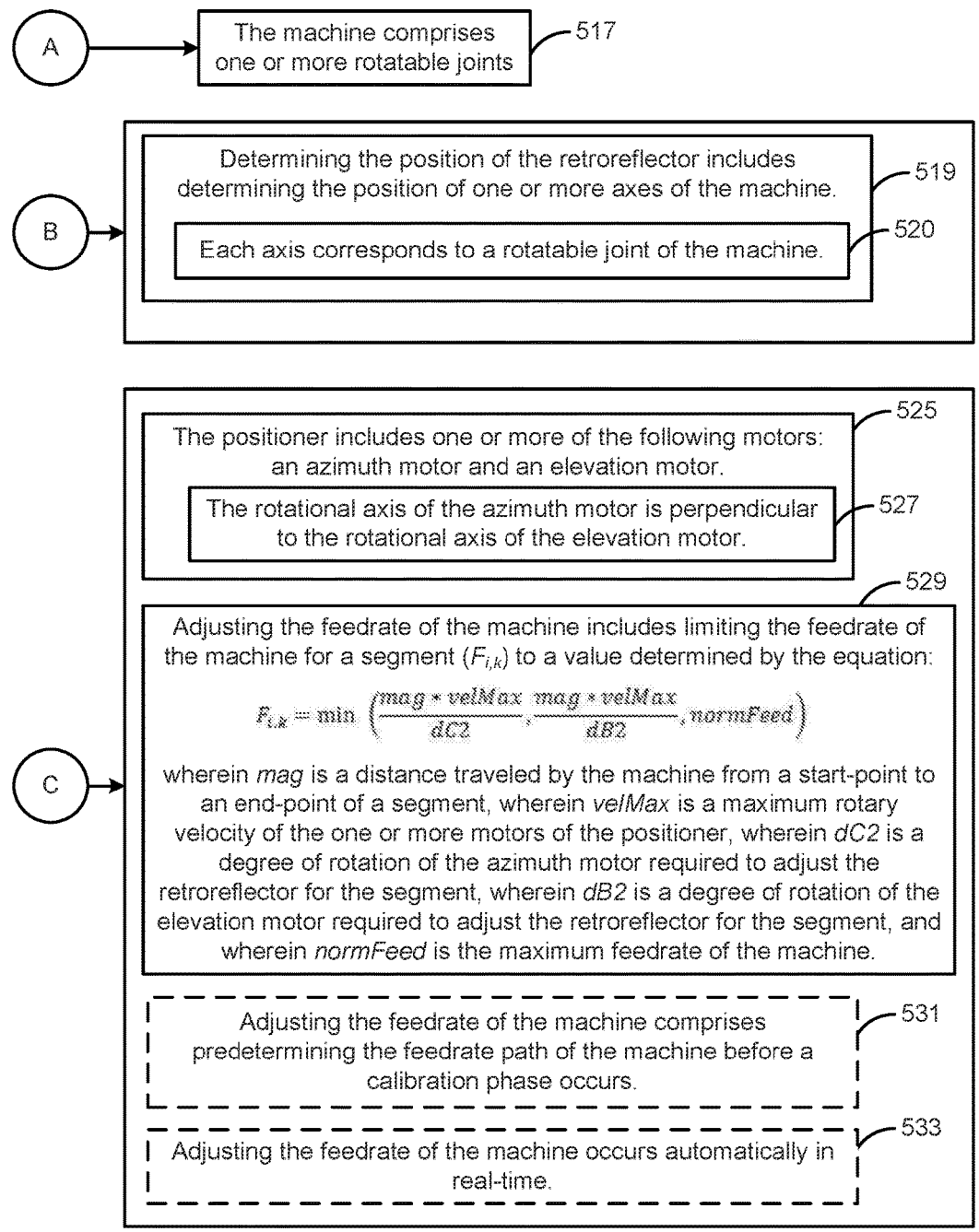

FIGS. 5A-5B illustrate a process flowchart corresponding to method 500 for adjusting machine feedrate, in accordance with some embodiments. Method 500 may be implemented by various embodiments of machine systems 100, 300, 301, and/or 400 described above. In some embodiments, method

500 may be implemented as a pre-process prior to a machining and/or tooling process, including a calibration phase thereof. Alternatively, and/or additionally, method 500 may be implemented in real-time during the operation of the machine system. In some embodiments, method 500 may be implemented as a specific portion of process 800 described below with reference to FIG. 8, such as at least operations 804, 808, and 810. Dashed lines within FIGS. 5A-5B indicate optional operations and/or components to method 500.

At operation 501, a first position and a second position of a machine 517 are determined. The first position and second position of machine 517 may be determined based on machine instructions for a particular machining and/or tooling operation. In some embodiments, the first position and the second position define a movement 503 of the machine 517 in three-dimensional space. The machine 517 may comprise one or more rotatable joints 520. For example, machine 517 may be a robotic arm, such as machine 120*a*, or other mechanism such as machines 120 and/or 120*b*. As previously described, machine instructions may include a number of lines of instructions for movement of a machine, such as machine 517, into various machine positions. As also previously described, the machine instructions may further include instructions for segmenting movement of machine 517 from one machine position to another. At operation 505, the movement 503 of the machine 517 is segmented into one or more segments 507. Each segment 507 may define an incremental movement of the machine 517 between a start-point and an end-point in three-dimensional space. In some embodiments, movement 503 of machine 517 may be segmented based on calculations such as those described in the paragraphs above.

At operation 509, the position of a retroreflector mounted on the machine 517 is determined at the start-point and the end-point of each segment 507 based on the position of the machine 517. In some embodiments, retroreflector is retroreflector 202 housed in a retroreflective system 200. In some embodiments, determining the position of the retroreflector may include determining the position of one or more axes 519 of the machine 517. Each axis 519 corresponds to a rotatable joint 520 of the machine 517. In some embodiments, rotatable joints 520 may be joints, such as joints 308*a*, 308*b*, 308*c*, 308*d*, and/or 308*e*. In some embodiments, determining the position of one or more axes 519 of the machine 517 may be based on the machine instructions for a particular operation.

As previously described, the retroreflector may comprise a trihedral prism having an input surface through which incident light is received and a plurality of reflective surfaces for reflecting the incident light. The trihedral prism may also define an at least partially transmissive window opposite the input surface such that leakage light passes through said window and escapes from the trihedral prism. In some embodiments, various other types of retroreflectors may be implemented in method 500, as previously described with reference to FIG. 2.

At operation 515, the feedrate of the machine 517 is adjusted, upon detecting that a velocity required for a positioner to move the retroreflector exceeds a certain segment feedrate threshold, such that an incident beam of light can maintain constant contact with the retroreflector throughout movement 503 of the machine 517 from the first position to the second position. In some embodiments, the positioner 525 may include one or more motors that are configured to move the retroreflector 521. For example, the positioner 525 includes one or more of the following motors: an azimuth motor and an elevation motor. In some embodiments, the azimuth motor may be azimuth motor 206 and the elevation motor may be elevation motor 204. The rotational axis of the azimuth motor, such as azimuth axis 206' may be perpendicular (527) to the rotational axis of the elevation motor, such as elevation axis 204'.

In particular embodiments, adjusting the feedrate of the machine 517 includes limiting the feedrate of the machine 517 to a value ($F_{i,k}$) determined by the equation (529):

$$F_{i,k} = \min\left(\frac{mag * velMax}{dC2}, \frac{mag * velMax}{dB2}, normFeed\right)$$

As previously described above, mag is a distance traveled by the machine form a start-point to an end-point of a segment 507, such as $mag_{j,k}$ previously described, velMax is a maximum rotary velocity of the one or more motors of the positioner 525, dC2 is a degree of rotation of the azimuth motor required to adjust the retroreflector for the segment 507, dB2 is a degree of rotation of the elevation motor required to adjust the retroreflector for the segment 507, and normFeed is the maximum feedrate of the machine 517. As also previously described in conjunction with FIG. 4, machine controller 404 may be adjusted to limit the feedrate of machine 120 at a particular segment 507 to the lowest value determined by equation 529 in order to ensure that retroreflector 521, and/or 202 can be adjusted to maintain contact with laser beam 190 emitted from laser management system 180. In some embodiments, process controller 402 may signal machine controller 404 to limit the feedrate of machine 120 at a particular segment 507 as such.

In some embodiments, adjusting the feedrate of the machine comprises predetermining the feedrate path of the machine before a calibration phase 531 occurs. As previously described, method 500 may be implemented as a pre-process prior to a machining and/or tooling process, including a calibration phase thereof. Method 500 may be implemented to adjust the machine feedrate in order to ensure that retroreflector 521 can maintain optimal optical contact with a light source, such as laser measurement system 180, during the calibration phase. Once calibrated, machine 517 may be used for machining and/or tooling operations with retroreflector 521 and/or laser measurement system 180 deactivated and/or removed from the machine system. Additionally, and/or alternatively, adjusting the feedrate of the machine 517 may occur automatically in real-time 533. This may occur during the machining process and/or the calibration process. In such embodiments, the position of the machine 517 and/or a mounted retroreflector may be further determined by a laser measurement system, such as laser measurement system 180. For example, reflections of the beam of light from retroreflector may be detected at operation 511. The position of a portion of the machine may then be determined based upon the reflected light at operation 513.

Figure 6:
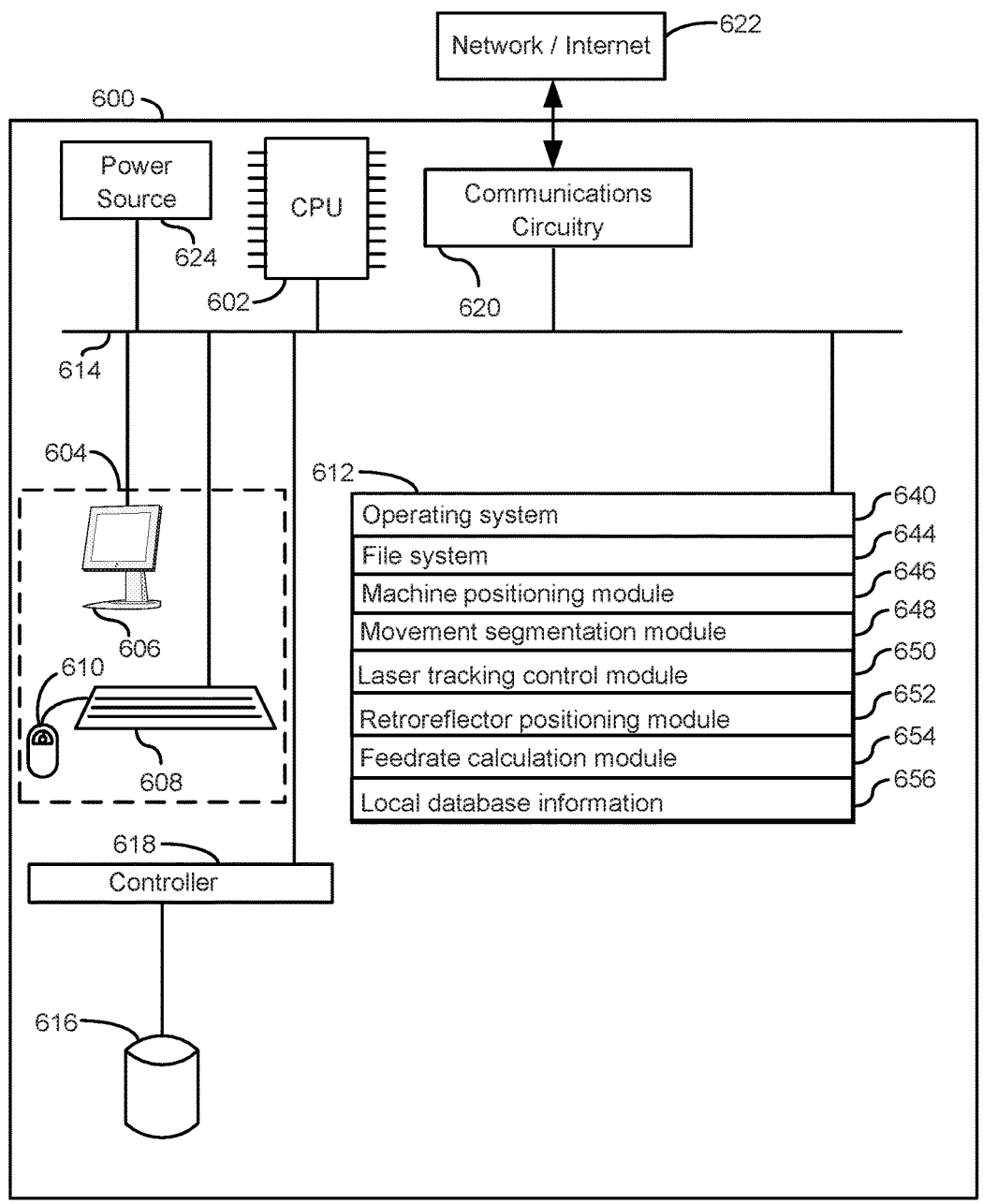
FIG. 6 is a block diagram illustrating an example of a computer system capable of implementing various processes described in the present disclosure.

FIG. 6 is a block diagram illustrating an example of a computer system 600 capable of implementing various processes described in the present disclosure. The system 600 typically includes a power source 624; one or more processing units (CPU's) 602 for executing modules, programs and/or instructions stored in memory 612 and thereby performing processing operations; one or more network or other communications circuitry or interfaces 620 for communicating with a network 622; controller 618; and one or more communication buses 614 for interconnecting these components. In some embodiments, network 622 may be a wireless and/or wired network as previously described in FIG. 4. In some embodiments, processing units 602 may function as a process controller, such as process controller 402. In some embodiments, processing units 602 may function as machine controller 404. In some embodiments, processing units 602 may function as laser measurement system controller 180'. In some embodiments, network 622 can be another communication bus, the Internet, an Ethernet, an Intranet, other wide area networks, local area networks, and metropolitan area networks. Communication buses 614 optionally include circuitry (sometimes called a chipset) that interconnects and controls communications between system components. System 600 optionally includes a user interface 604 comprising a display device 606, a keyboard 608, and a mouse 610.

Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices 616 remotely located from the CPU(s) 602.

Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 640 that includes procedures for handling various basic system services and for performing hardware dependent tasks;
- a file system 644 for storing various program files;
- a machine control module 646 for determining machine positions, such as in operation 501, and/or regulating machine movement 503, such as in operation 515;
- a movement segmentation module 648 for segmenting the movement of the machine into segments 507 defining an incremental movement of the machine, such as in operation 505;
- a laser tracker control module 650 for controlling operation of a laser measurement system, such as laser measurement system 180, to illuminate a retroreflector and determine real-time machine positions by receiving and measuring light reflected from the retroreflector, such as in operations 511 and 513;
- a retroreflector positioning module 652 for determining the movement required for one or more positioners to steer the retroreflector at various points of a segment 507 in order to maintain optical contact with a laser beam 190 emitted by a laser measurement system 180, such as in operation 509;
- a feedrate calculation module 654 for determining the maximum allowable machine feedrate based on positioning information received from steerable retroreflective systems 200, machine controllers 404, and/or laser measurement system controllers 180' by utilizing various algorithms, such as equation 529; and
- local database information 656 comprising operating parameters, measurements, machine attributes, retroreflector attributes, laser measurement system attributes and/or other network messages.

Various implementations of the present disclosure may exclude a combination of one or more of the above identified elements. For example, in embodiments, where automatic adjustment of machine feedrate does not occur in real-time during operation, there may not be a laser tracking control module 650. Each of the above identified elements may be stored in one or more of the previously mentioned memory devices, and corresponds to a set of instructions for performing a function described above. One or more of the above identified modules may operate by retrieving input from one or more laser measurement systems 180 and/or 180b, steerable retroreflective systems 200, machine controllers 404, and/or laser measurement system controllers 180', which may be connected via network 622. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "system for optical endpoint control optimization," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement an optical endpoint control optimization system and how features are allocated among them will vary from one implementation to another, and may depend in part on the amount of data traffic that the system must handle during peak usage periods as well as during average usage periods.

Examples of Aircraft and Methods of Fabricating and Operating Aircraft

Figure 7:
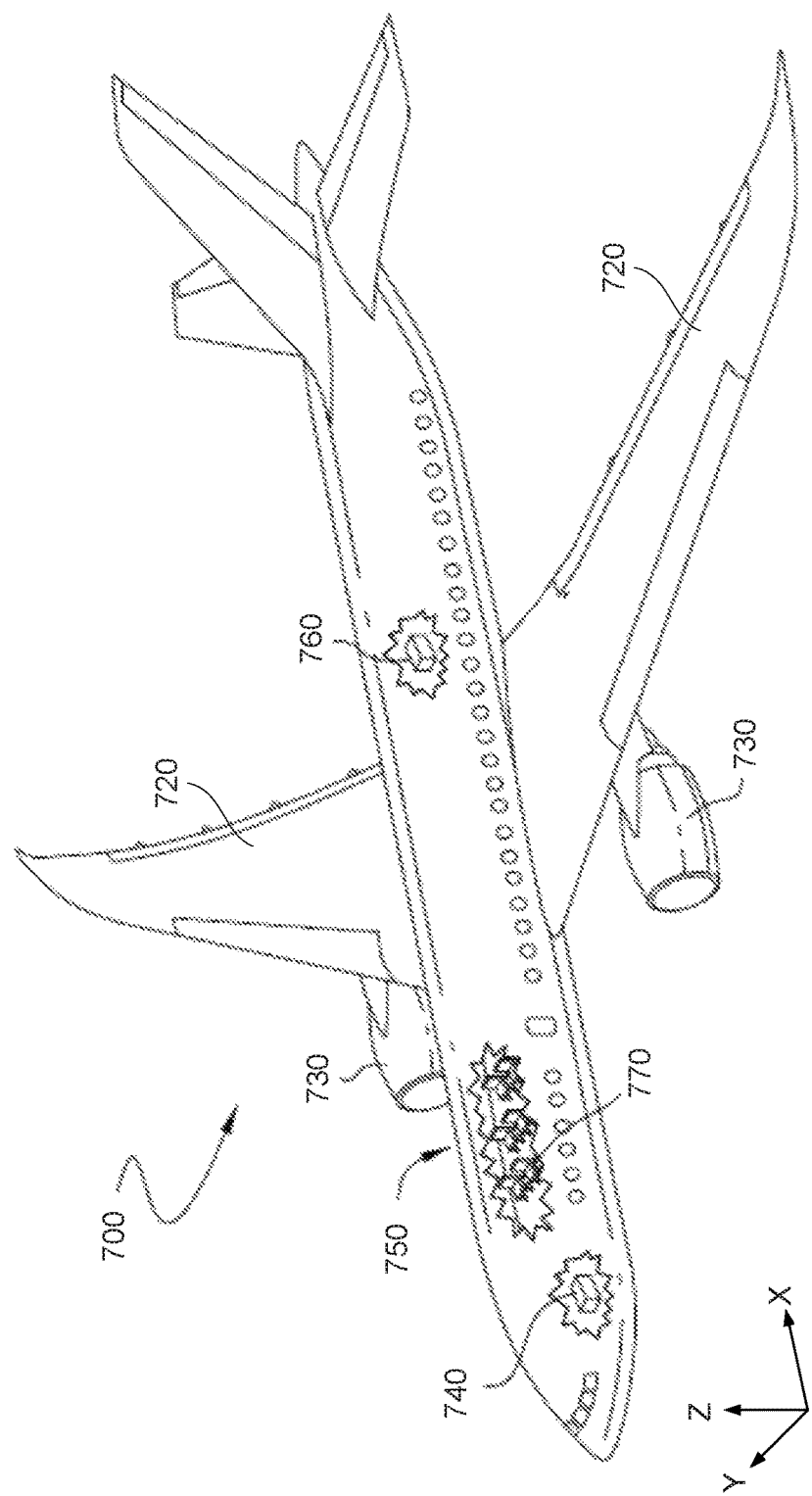
FIG. 7 is a schematic illustration of an aircraft, in accordance with some embodiments.

To better understand various aspects of implementation of the described systems and techniques, a brief description of an aircraft and aircraft wing is now presented. FIG. 7 is a schematic illustration of aircraft 700, in accordance with some embodiments. As depicted in FIG. 7, aircraft 700 is defined by a longitudinal axis (X-axis), a lateral axis (Y-axis), and a vertical axis (Z-axis). In various embodiments, aircraft 700 comprises airframe 750 with interior 770. Aircraft 700 includes wings 720 coupled to airframe 750. Aircraft 700 may also include engines 730 supported by wings 720. In some embodiments, aircraft 700 further includes a number of high-level inspection systems such as electrical inspection system 740 and environmental inspection system 760. In other embodiments, any number of other inspection systems may be included.

Aircraft 700 shown in FIG. 7 is one example of a vehicle of which components may be fabricated, modified, or machined by machine systems 100, 300, 301, and/or 400 by implementation of method 500, in accordance with illustrative embodiments. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

Figure 8:
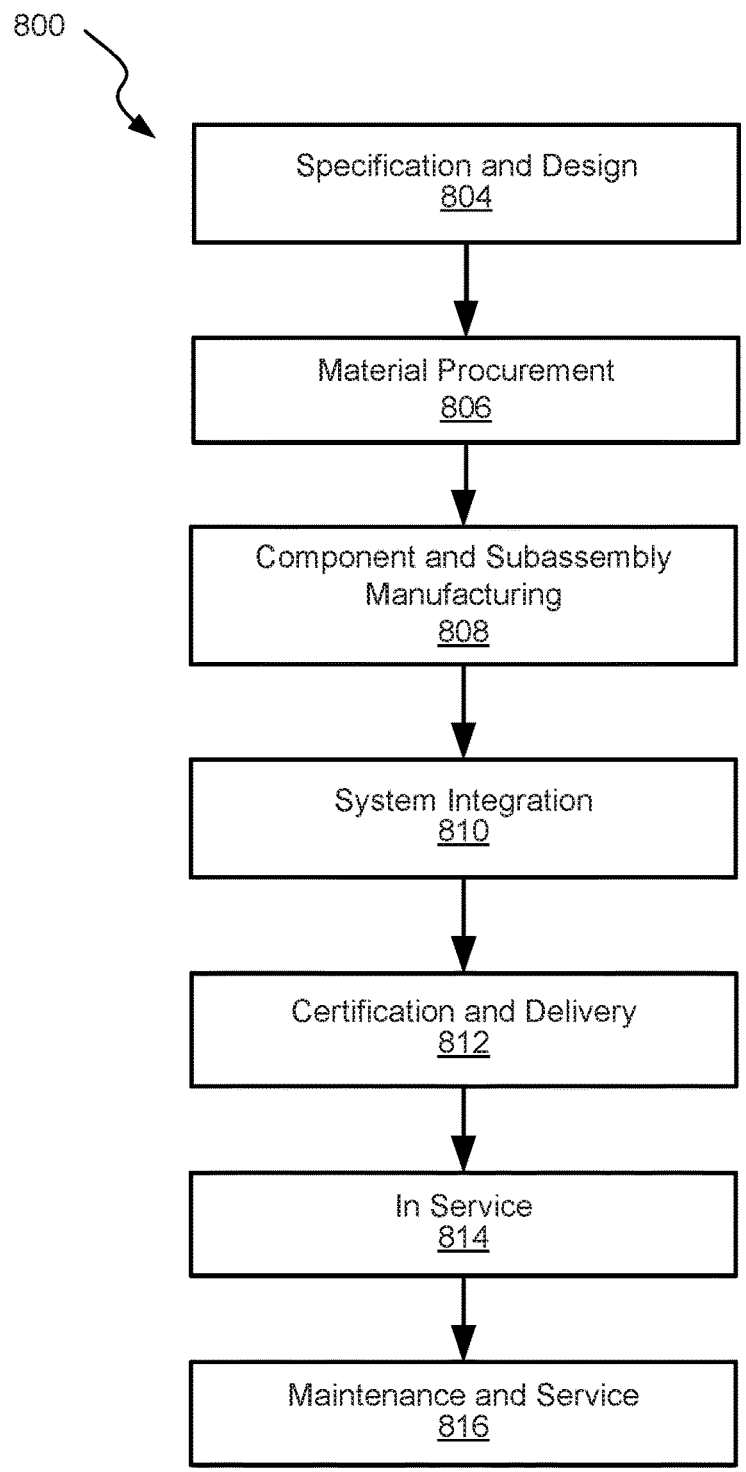
FIG. 8 is a block diagram of aircraft production and service methodology that may utilize methods and assemblies described herein.

Examples of the present disclosure may be described in the context of aircraft manufacturing and service method 800 as shown in FIG. 8 and aircraft 700 as shown in FIG. 7. During pre-production, illustrative method 800 may include specification and design (block 804) of aircraft 700 and material procurement (block 806). During production, component and subassembly manufacturing (block 808) and inspection system integration (block 810) of aircraft 700 may take place. Described methods, and assemblies formed by these methods, can be used in any of specification and design (block 804) of aircraft 700, material procurement (block 806), component and subassembly manufacturing (block 808), and/or inspection system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described methods, and assemblies formed by these methods, can be used in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 800). For example, components or subassemblies corresponding to component and subassembly manufacturing (block 808) may be fabricated or manufactured in a manner similar to components or subassemblies produced while aircraft 700 is in service (block 814). Also, one or more examples of the apparatus(es), method(s), or combination thereof may be utilized during production stages (block 808) and (block 810), for example, by substantially expediting assembly of or reducing the cost of aircraft 700. Similarly, one or more examples of the apparatus or method realizations, or a combination thereof, may be utilized, for example and without limitation, while aircraft 700 is in service (block 814) and/or during maintenance and service (block 816).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A machine system optical endpoint control optimization comprising:
    a machine capable of movement in at least one direction, wherein the machine is configured such that, during a calibration phase, a steerable retroreflective system is mounted upon the machine for movement therewith, the steerable retroreflective system comprising:
        a retroreflector for reflecting at least some light incident thereupon; and
        a positioner for moving said retroreflector;
    a controller configured to control movement of the machine in the at least one direction; and
    wherein the machine system is configured to adjust a feedrate of the machine, upon determining that a velocity required for the positioner to move the retroreflector to a desired position exceeds a certain segment feedrate threshold, such that an incident beam of light can maintain constant contact with the retroreflector throughout movement of the machine from a first position to a second position.

2. The machine system of claim 1, wherein the machine comprises one or more rotatable joints.

3. The machine system of claim 2, further configured to determine the position of the retroreflector based on determining the position of one or more axes of the machine, wherein each axis corresponds to a rotatable joint of the machine.

4. The machine system of claim 1, wherein the positioner includes one or more of the following motors:
    an azimuth motor; and
    an elevation motor,
    wherein a rotational axis of the azimuth motor is perpendicular to a rotational axis of the elevation motor.

5. The machine system of claim 4, wherein the adjusting the feedrate of the machine includes limiting the feedrate of the machine for a segment ($F_{i,k}$) to a value determined by the equation:

$$F_{i,k} = \min\left(\frac{mag * velMax}{dC2}, \frac{mag * velMax}{dB2}, normFeed\right)$$

wherein mag is a distance traveled by the machine from a start-point to an end-point of the segment;
wherein velMax is a maximum rotary velocity of the one or more motors of the positioner;
wherein dC2 is a degree of rotation of the azimuth motor required to adjust the retroreflector for the segment;
wherein dB2 is a degree of rotation of the elevation motor required to adjust the retroreflector for the segment; and
wherein normFeed is the maximum feedrate of the machine.

6. The machine system of claim 1, wherein the machine system is further configured to adjust the feedrate of the machine by predetermining the feedrate path of the machine before the calibration phase occurs.

7. The machine system of claim 1, wherein the machine system is further configured to automatically adjust the feedrate of the machine in real-time.

8. The machine system of claim 7, wherein the machine system is further configured to
   detect reflections of the beam of light from the retroreflector; and
   determine the position of a portion of the machine based upon the reflected light.

9. A method adjusting machine feedrate, the method comprising:
   determining a first position and a second position of a machine, wherein the first position and the second position define a movement of the machine in three-dimensional space;
   segmenting the movement of the machine into one or more segments, wherein each segment defines an incremental movement of the machine between a start-point and an end-point in three-dimensional space;
   determining a position of a retroreflector mounted on the machine at the start-point and the end-point of each segment based on a position of the machine;
   adjusting the feedrate of the machine, upon determining that a velocity required for a positioner to move the retroreflector to a desired position exceeds a certain segment feedrate threshold, such that an incident beam of light can maintain constant contact with the retroreflector throughout movement of the machine from the first position to the second position.

10. The method of claim 9, wherein the machine comprises one or more rotatable joints.

11. The method of claim 10, wherein determining the position of the retroreflector includes determining the position of one or more axes of the machine, wherein each axis corresponds to a rotatable joint of the machine.

12. The method of claim 9, wherein the positioner includes one or more of the following motors:
    an azimuth motor, and
    an elevation motor,
    wherein a rotational axis of the azimuth motor is perpendicular to a rotational axis of the elevation motor.

13. The method of claim 12, wherein the adjusting the feedrate of the machine includes limiting the feedrate of the machine for a segment ($F_{i,k}$) to a value determined by the equation:

$$F_{i,k} = \min\left(\frac{mag * velMax}{dC2}, \frac{mag * velMax}{dB2}, normFeed\right)$$

wherein mag is a distance traveled by the machine from a start-point to an end-point of a segment;
   wherein velMax is a maximum rotary velocity of the one or more motors of the positioner;
   wherein dC2 is a degree of rotation of the azimuth motor required to adjust the retroreflector for the segment;
   wherein dB2 is a degree of rotation of the elevation motor required to adjust the retroreflector for the segment; and
   wherein normFeed is the maximum feedrate of the machine.

14. The method of claim 9, wherein adjusting the feedrate of the machine comprises predetermining the feedrate path of the machine before a calibration phase occurs.

15. The method of claim 9, wherein adjusting the feedrate of the machine occurs automatically in real-time.

16. The method of claim 15, further comprising:
    detecting reflections of the beam of light from the retroreflector; and
    determining the position of a portion of the machine based upon the reflected light.

17. A non-transitory computer readable medium comprising one or more programs configured for execution by a computer system, the one or more programs including instructions for:
    determining a first position and a second position of a machine, wherein the first position and the second position define a movement of the machine in three-dimensional space;
    segmenting the movement of the machine into one or more segments, wherein each segment defines an incremental movement of the machine between a start-point and an end-point in three-dimensional space;
    determining a position of a retroreflector mounted on the machine at the start-point and the end-point of each segment based on a position of the machine;
    automatically adjusting the feedrate of the machine, upon determining that a velocity required for a positioner to move the retroreflector to a desired position exceeds a certain segment feedrate threshold, such that an incident beam of light can maintain constant contact with the retroreflector throughout movement of the machine from the first position to the second position.

18. The non-transitory computer readable medium of claim 17, wherein the machine comprises one or more rotational joints.

19. The non-transitory computer readable medium of claim 18, wherein determining the position of the retroreflector includes determining the position of one or more axes of the machine, wherein each axis corresponds to a rotatable joint of the machine.

20. The non-transitory computer readable medium of claim 17, wherein the positioner includes one or more of the following motors:
    an azimuth motor, and
    an elevation motor,
    wherein a rotational axis of the azimuth motor is perpendicular to the rotational axis of the elevation motor.

21. The non-transitory computer readable medium of claim 20, wherein the adjusting the feedrate of the machine includes limiting the feedrate of the machine for a segment ($F_{i,k}$) to a value determined by the equation:

$$F_{i,k} = \min\left(\frac{mag * velMax}{dC2}, \frac{mag * velMax}{dB2}, normFeed\right)$$

wherein mag is a distance traveled by the machine from a start-point to an end-point of a segment;
   wherein velMax is a maximum rotary velocity of the one or more motors of the positioner;
   wherein dC2 is a degree of rotation of the azimuth motor required to adjust the retroreflector for the segment;
   wherein dB2 is a degree of rotation of the elevation motor required to adjust the retroreflector for the segment; and
   wherein normFeed is the maximum feedrate of the machine.

22. The non-transitory computer readable medium of claim 17, wherein adjusting the feedrate of the machine comprises predetermining the feedrate path of the machine before a calibration phase occurs.

23. The non-transitory computer readable medium of claim 17, wherein adjusting the feedrate of the machine occurs automatically in real-time.

\* \* \* \* \*